United States Patent
Lin (10) Patent No.: US 9,352,422 B2
(45) Date of Patent: May 31, 2016

(54) ELECTRONIC WELDING SEAM GAUGE

(71) Applicant: Taiwan Power Testing Technology Co., Ltd., New Taipei (TW)

(72) Inventor: Yu-Chiang Lin, New Taipei (TW)

(73) Assignee: TAIWAN POWER TESTING TECHNOLOGY CO., LTD., New Taipei (TW)

( * ) Notice: Subject to any disclaimer, the term of this patent is extended or adjusted under 35 U.S.C. 154(b) by 43 days.

(21) Appl. No.: 14/451,256

(22) Filed: Aug. 4, 2014

(65) Prior Publication Data

US 2015/0047215 A1   Feb. 19, 2015

(30) Foreign Application Priority Data

Aug. 13, 2013   (TW) .............................. 102215209 U (51) Int. Cl.
| | |
|---|---|
| *G01B 3/20* | (2006.01) |
| *B23K 31/12* | (2006.01) |
| *G01B 3/56* | (2006.01) |
| *G01B 3/22* | (2006.01) |
| *G01B 3/28* | (2006.01) |
| *G01B 5/06* | (2006.01) |

(52) U.S. Cl.
CPC .............. *B23K 31/125* (2013.01); *G01B 3/205* (2013.01); *G01B 3/22* (2013.01); *G01B 3/28* (2013.01); *G01B 3/56* (2013.01); *G01B 5/061* (2013.01)

(58) Field of Classification Search
CPC ...... G01B 7/001; G01B 2210/58; G01B 3/46; G01B 5/12; G01B 7/02; G01B 7/34; G01B 3/44; G01B 7/10; G01B 7/102; G01B 7/12; G01B 7/13; G01B 7/28; G01B 7/282
USPC .................................... 33/501.6, 501.12, 542
See application file for complete search history.

(56) References Cited

U.S. PATENT DOCUMENTS

| | | | | |
|---|---|---|---|---|
| 2,016,978 | A | * | 10/1935 | Thomas ................. G01B 7/001 33/558 |
| 2,365,593 | A | * | 12/1944 | Rights .................... G01B 7/001 33/501.6 |
| 2,579,569 | A | * | 12/1951 | Highberg ................. G01B 3/44 33/501.6 |
| 4,033,043 | A | * | 7/1977 | Cunningham ....... A61B 5/1076 33/542 |

(Continued)

*Primary Examiner* — Yaritza Guadalupe-McCall
(74) *Attorney, Agent, or Firm* — Maschoff Brennan (57) ABSTRACT

An electronic welding seam gauge comprises a reference positioning block and an electronic displacement measuring member. The reference positioning block has a contacting surface that abuts against a first abutting surface to form a first reference point, and the electronic displacement measuring member is disposed at a side of the reference positioning block, having a displacement probe and a displaying portion, wherein a displacement that the displacement probe moves to abut against a second reference point of a second abutting surface with respect to the first reference point is displayed by the displaying portion for providing a more precise measurement with respect to the welding seam, so as to enable the welded product to comply with the standards.

9 Claims, 8 Drawing Sheets

(56) References Cited

U.S. PATENT DOCUMENTS

| | | | | | |
|---|---|---|---|---|---|
| 4,197,650 | A | * | 4/1980 | Bailey | G01B 7/001 33/501.6 |
| 4,606,129 | A | * | 8/1986 | Barrowman | G01B 7/31 33/501.09 |
| 4,905,378 | A | * | 3/1990 | Culver | G01B 3/28 33/531 |
| 5,010,658 | A | * | 4/1991 | Griffith | G01B 7/282 33/542 |
| 5,251,381 | A | * | 10/1993 | Turner | G01B 7/30 33/534 |
| 6,079,113 | A | * | 6/2000 | Helmrichs | G01B 7/293 33/532 |
| 6,307,164 | B1 | * | 10/2001 | Campbell | G01G 5/006 177/141 |
| 6,412,187 | B1 | * | 7/2002 | Sasaki | G01B 3/004 33/542 |
| 7,100,298 | B2 | * | 9/2006 | Kiwada | G01B 3/22 33/613 |
| 7,347,002 | B2 | * | 3/2008 | Foege | F41A 31/02 33/542 |
| 2015/0047215 | A1 | * | 2/2015 | Lin | G01B 3/205 33/501.6 |

* cited by examiner

FIG.8

ELECTRONIC WELDING SEAM GAUGE

FIELD OF THE INVENTION

The present invention is related to a welding seam gauge, and more particularly, to an electronic welding seam gauge.

BACKGROUND OF THE INVENTION

Welding is a manufacturing technique to joint metal or other thermal plastic materials such as plastic by a heating method. After the material are welded, a welding seam is formed at the jointed section between two objects, in which the welding seam's depth, width and height, the weld throat's depth and the height difference between both welded sides are critical factors in relation to the strength of the welded structure. Taking a gas cylinder that contains high pressure gas as an example, a gas cylinder usually has a shroud and a foot ring welded attached to the cylinder body, and if they are poorly welded, the shroud or the foot ring of the gas cylinder may be cracked or detached to thus cause a disaster. Therefore the authorities have established particular strict standards with respect to the welding seam of the gas cylinders.

A welding seam is measured by a welding seam gauge which measures the welding seam's depth, width and height, the weld throat's depth or the height difference between both welded sides in accordance with the measuring scale on the gauge. However, the smallest unit of the measuring scale on the gauge is in a unit of 1 mm, so that the precision of the gauge is limited to 1 mm. Therefore it may become insufficient in a case when measuring smaller unit scales such as a 0.1 mm is required. In addition, since the scale numbers on the gauge are usually very small, it is difficult for a user to read the values during the measurement especially when a user still needs to record the measured values separately after each measurement. It thus takes time for the measurement.

SUMMARY OF THE INVENTION

According to the above, the object of the present invention is to overcome the above drawbacks in the prior art by providing an electronic welding seam gauge that enhances the precision of the measurement, displays the measured value and digitally stores the measured value, so that the measuring process is simplified.

The technical means of the present invention to resolve the issues in the prior art is an electronic welding seam measuring gauge, which comprises a reference positioning block and an electronic displacement measuring member. The reference positioning block has a contacting edge provided for being abutting against a first abutting surface on the contacting edge as a first reference point. The electronic displacement measuring member is disposed at a side of the reference positioning block and has a displacement probe and a displaying portion, wherein a displacement that the displacement probe moves to abut against a second reference point of a second abutting surface with respect to the first reference point is displayed by the displaying portion.

According to an embodiment of the present invention, the reference positioning block is formed with a cantilever portion extending from the side of the reference positioning block, and the electronic displacement measuring member is fixed on the cantilever portion.

According to an embodiment of the present invention, the contacting edge of the reference positioning block includes a first reference edge perpendicular to a moving direction of the displacement probe.

According to an embodiment of the present invention, the contacting edge of the reference positioning block includes a second reference edge perpendicular to the moving direction of the displacement probe, and the second reference edge is provided at the cantilever portion with a horizontal level different to the first reference edge.

According to an embodiment of the present invention, the contacting edge of the reference positioning block includes a third reference edge parallel to the moving direction of the displacement probe, and the third reference edge is provided at the other side of the reference positioning block.

According to an embodiment of the present invention, the contacting edge of the reference positioning block includes a fourth reference edge parallel to the moving direction of the displacement probe, and the fourth reference edge is provided at a side of the cantilever portion of the reference positioning block.

According to an embodiment of the present invention, further comprises a zeroing correcting block that has a zeroing correcting surface for allowing the zeroing surface to be abutting against by the contacting edge and the displacement probe so as to zeroing correcting the electronic displacement measuring member.

According to an embodiment of the present invention, the electronic displacement measuring member has a transmitting element for transmitting data of the displacement to a storage member.

According to an embodiment of the present invention, further comprises an angle probe rotary disposed at a side surface of the reference positioning block, and the reference positioning block is provided with an angle graduation mark corresponding to the angle probe.

According to an embodiment of the present invention, the displacement is displayed by the displaying portion with a precision of 0.01 mm.

By means of the technical means of the present invention, the electronic displacement measuring member provides a more precise measurement that complies with stricter standard, and an easy reading of the measured value by means of displaying the measured value in a displaying portion as compared to the conventional welding seam gauge. Further, by means of transmitting the read amount of displacement to a storage member, it also saves the time of recording and searching the amount.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

As referring to the FIGS. 1 to 4, an electronic welding seam gauge 100 according to a first embodiment of the present invention includes a reference positioning block 1 and an electronic displacement measuring member 2.

The reference positioning block 1 includes a body portion 11, a cantilever portion 12 and a contacting edge 13. The body portion 11 is in a rectangular shape and the cantilever portion 12 is formed extending from a side of the body portion 11 to support the displacement measuring member 2, and the cantilever portion 12 is in rectangular shape as well. The contacting edge 13 is provided at a side of the reference positioning block 1 for being abutting against a first abutting surface A1. In this embodiment, the contacting edge 13 has a first reference edge 131, a second reference edge 132, a third reference edge 133 and a fourth reference edge 134. In this embodiment, the first reference edge 131 is a bottom surface of the body portion 11. The third reference edge 133 is a side surface of the body portion 11 opposite to the cantilever portion 12. The second reference edge 132 is a bottom surface of the cantilever portion 12, and the fourth reference edge 134 is a side surface of the cantilever portion 12.

The displacement measuring member 2 is connected with the cantilever portion 12 and has a displaying portion 21, a displacement probe 22 and a transmitting element 23. The displacement probe 22 is extending from the bottom of the cantilever portion 12, and according to this embodiment the displacement probe 22 moves along a direction perpendicular to the second reference edge 132. The displacement probe 22 is provided for abutting against a second abutting surface A2, and thereafter a displacement D is obtained according to a first reference point P1 formed by the reference positioning block 1 abutting against the first abutting surface A1 and a second reference point P2 formed by having the displacement probe 22 to being abutted against the second abutting surface A2. The displacement D represents the the welding seam's depth, width and height, the weld throat's depth or the height difference between both welded sides by use of every different pair of measurement reference points. The displacement D is displayed by the displaying portion 21. In this embodiment, the displaying portion 21 is a liquid crystal display, which is controlled by a power button 211, a unit switching button 212 and a zeroing button 213. The smallest unit of the displacement displayed by the displaying portion is 0.01 mm, which allows a more precise measurement for the displacement as compared to the conventional welding seam gauge. And of course, the present invention is not to limit this, and the measurable for the displacement can be more precise. The present invention enables the user to read the displacement displayed by the displaying portion more quickly. The power button 211 is for turning on the displacement measuring member 2, the unit switching button 212 is for switching the measuring unit to be displayed and the zeroing button 213 is for zeroing the position setting of the displacement probe 22. The transmitting element 23 is for transmitting the displacement to a storage member 24 for storage, so that a user does not need to record the data separately to enhance the measurement efficiency.

Figure 1:
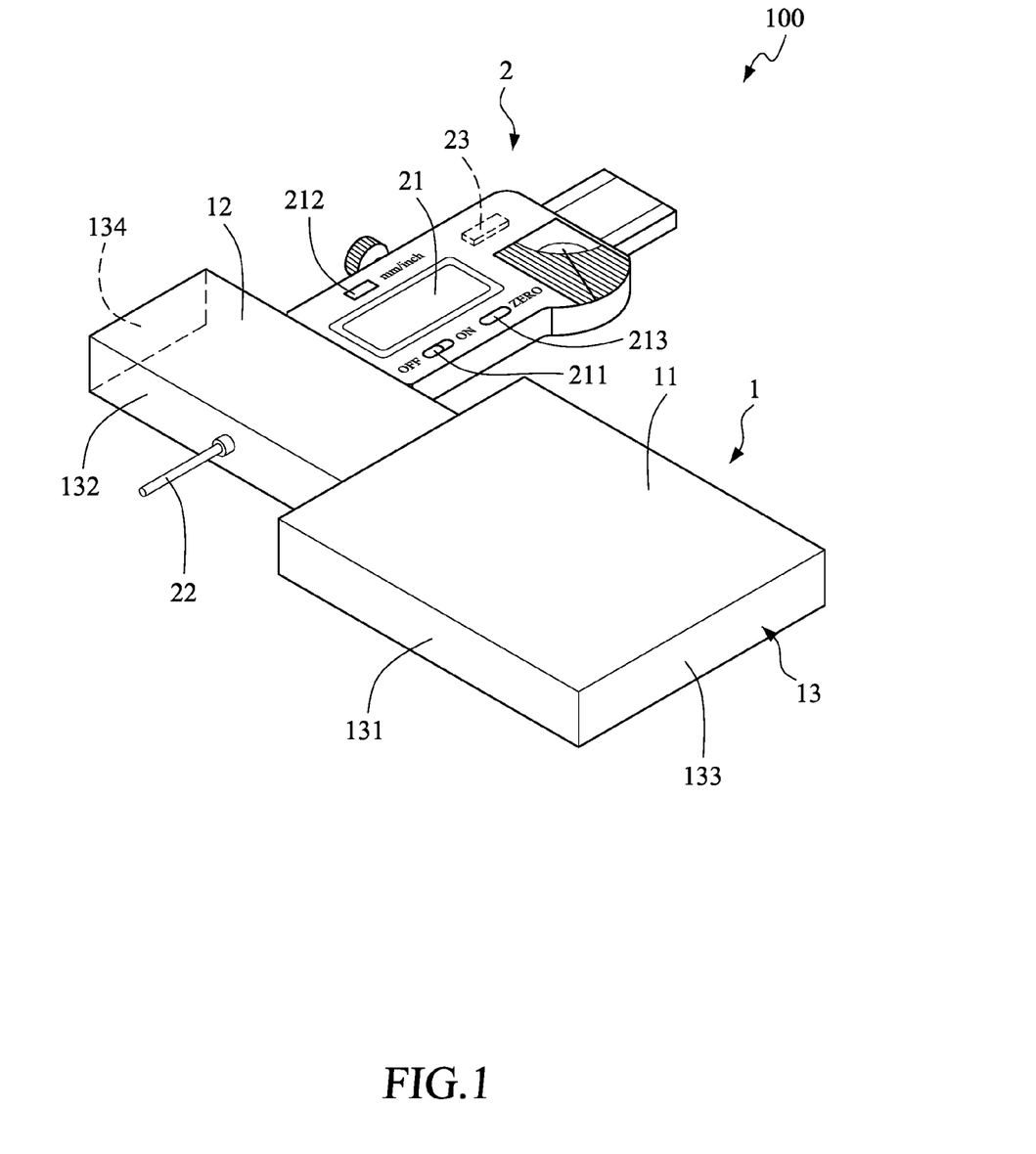
FIG. 1 is a stereogram of the electronic welding seam gauge according to the first embodiment of the present invention.
Figure 2:
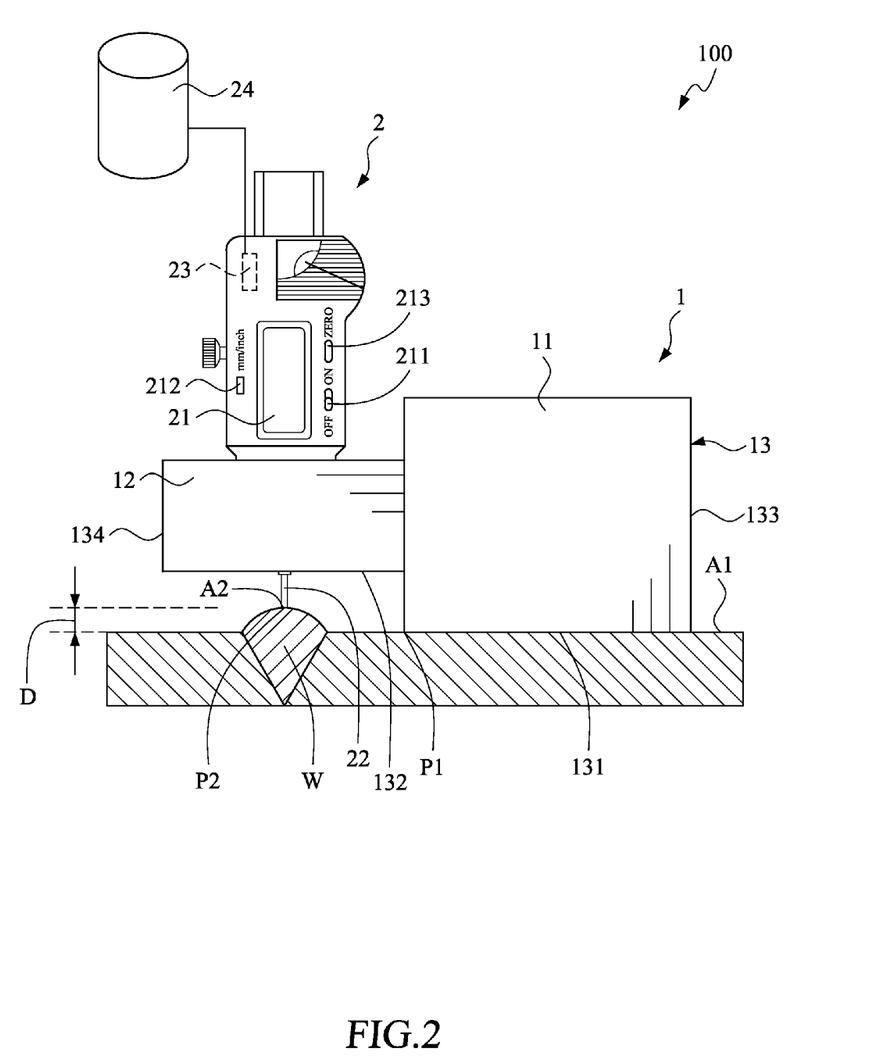
FIG. 2 is the first schematic drawing illustrates the electronic welding seam gauge according to the first embodiment of the present invention.

As shown in FIG. 2, when the electronic welding seam gauge 100 is used to measure the height of a welding seam W, the first reference edge 131 is used as the contacting edge 13 to abut against the welded portion, i.e. the first abutting surface A1, to form a first reference point P1. The displacement probe 22 is abutting against the highest point of the welding seam W, i.e. the second abutting surface A2 to form the second reference point P2. The displacement probe 22 is then obtained as moving a displacement D according to the first reference point P1 and the second reference point P2, in which the displacement D is the height of the welding seam W. The amount of displacement D, e.g. 2.15 mm, is then displayed by the displaying portion 21.

Figure 3:
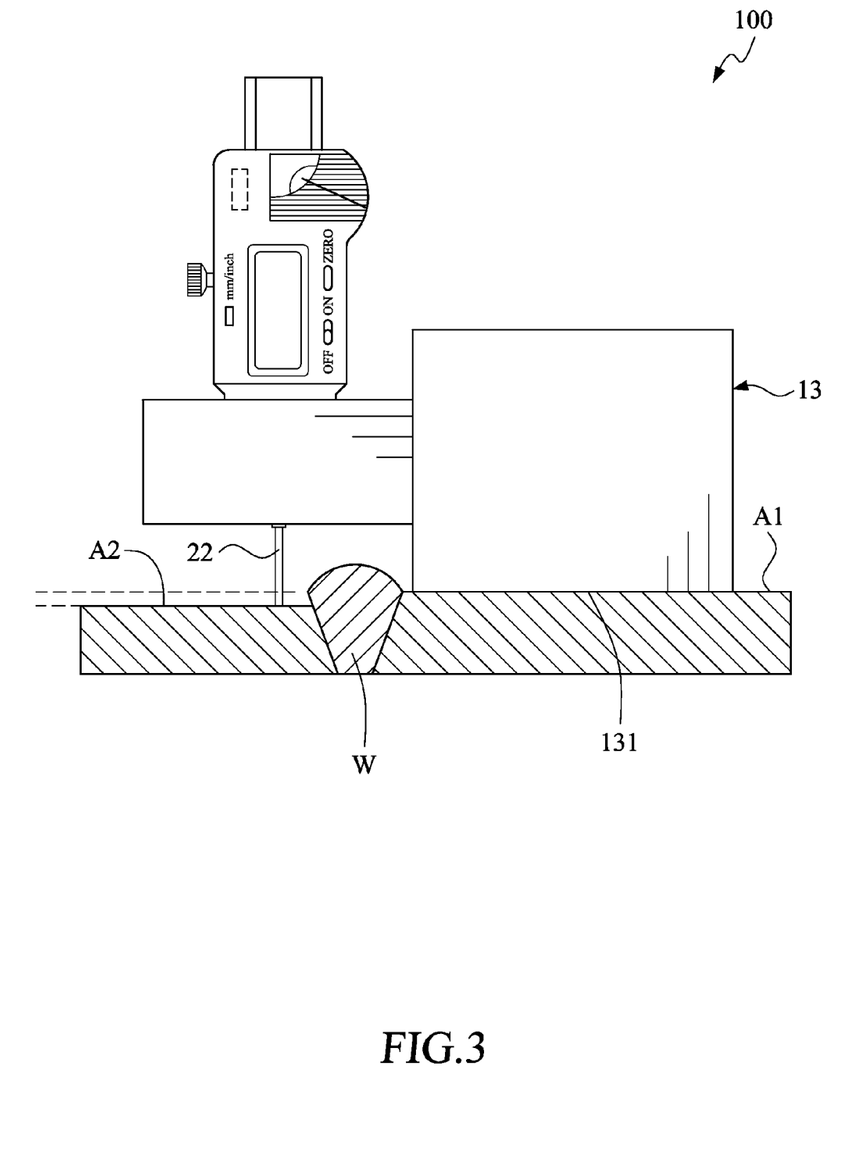
FIG. 3 is the second schematic drawing illustrates the electronic welding seam gauge according to the first embodiment of the present invention.

As shown in FIG. 3, when the electronic welding seam gauge 100 is used to measure the difference between the heights of the two sides of the welded portion, the first reference edge 131 may then be used as the contacting edge 13 to abut against a side of the welded portion of the welding seam W, i.e. the first abutting surface A1, and the displacement probe 22 is abutting against the other side of the welded portion of the welding seam W, i.e. the second abutting surface A2, so as to measure the difference between the heights of the two sides of the welded portion.

Figure 4:
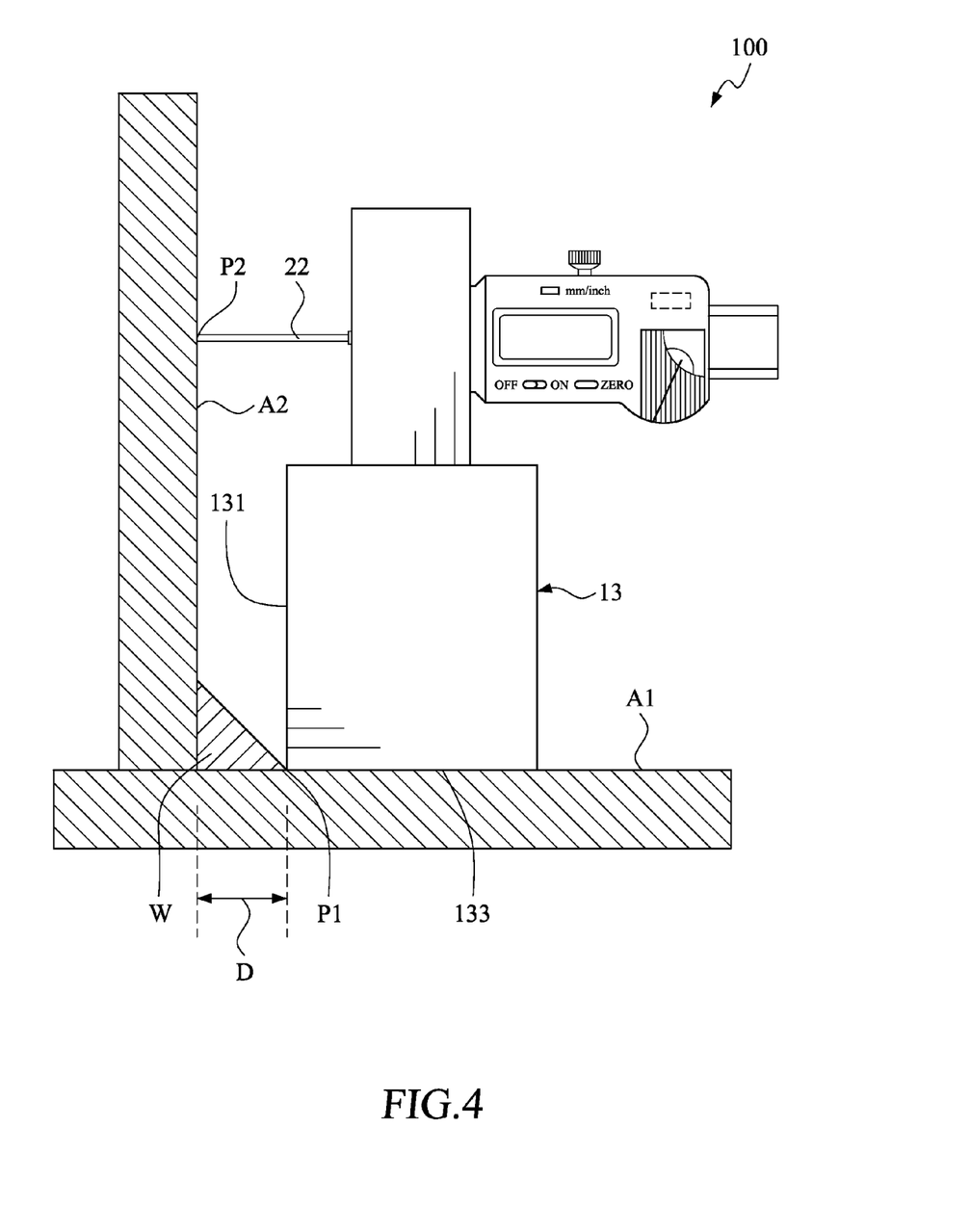
FIG. 4 is the third schematic drawing illustrates the electronic welding seam gauge according to the first embodiment of the present invention.

As shown in FIG. 4, when the electronic welding seam gauge 100 is used to measure the depth of the weld throat of the welding seam W, the third reference edge 133 is used as the contacting edge 13 to abut against a side of the welded portion of the welding seam W, i.e. the first abutting surface A1, and the first reference edge 131 is abutting against a base angle of the welding seam W to form a first reference point P1. The displacement probe 22 is abutting against the welded portion of the other side of the welding seam W, i.e. the second abutting surface A2, to form the second reference point P2, by which the weld throat width is measured and then the weld throat depth can be calculated according to the measurement of the weld throat width.

Figure 5:
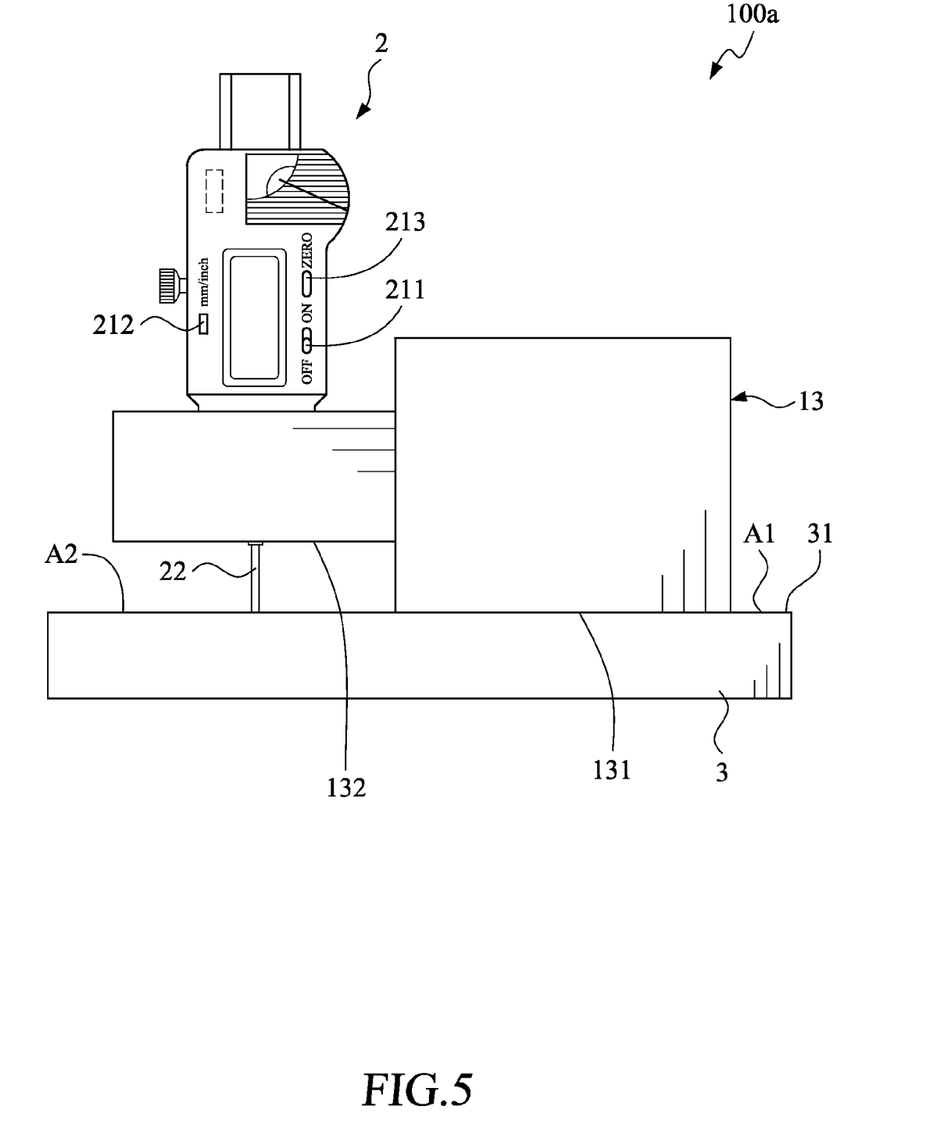
FIG. 5 is the first schematic drawing illustrates the electronic welding seam gauge according to the second embodiment of the present invention.

As referring to FIG. 5, an electronic welding seam gauge 100a according to a second embodiment of the present invention further includes a zeroing correcting block 3 that may be used to correct the displacement measuring member 2, so as to correct the position of the displacement probe 22 to a surface parallel to the first abutting surface A1. In this embodiment, the zeroing correcting block 3 is a rectangular thin block that has a smooth zeroing correcting surface 31, so that the first reference surface 131 of the contacting surface 13 may be completely attached to the zeroing correcting surface 31, and at the same time the displacement probe 22 may be abutting against the zeroing correcting surface 31, which means the first abutting surface A1 and the second abutting surface A2 is positioned on a same horizontal surface, and then a user may press the zeroing button 213 to correct the position of the displacement probe 22 to zero. In this way, a zeroing step may be performed prior to each measurement to have more precise displacements for the measurements. Of course, in other embodiments, the reference edge 132 of the contacting surface 13 may be completely attached to the zeroing correcting surface 31, and having the surface parallel to the second reference edge 132 as the correcting surface.

Figure 6:
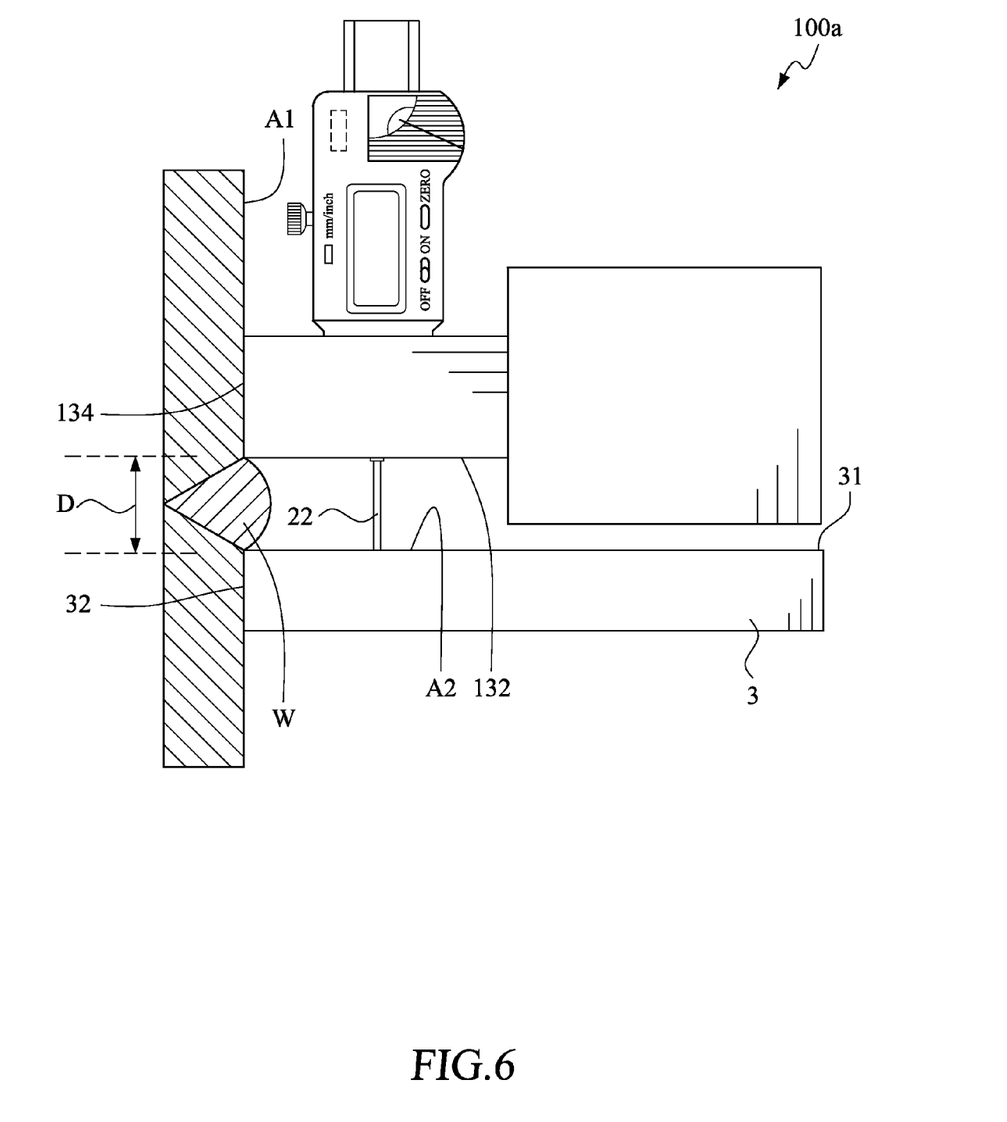
FIG. 6 is the second schematic drawing illustrates the electronic welding seam gauge according to the second embodiment of the present invention.

Moreover, as shown in FIG. 6, the electronic welding seam gauge 100a of this embodiment maybe used to measure the width of the welding seam W by means of having the fourth reference surface 134 abutted against a welded portion on a side of the welding seam W, i.e. the first abutting surface A1, and having the second reference surface 132 abutted against an edge of the welding seam W, and then having the zeroing correcting block 3 abutted against a welded portion on another side of the welding seam W in the same manner, followed by having the displacement probe 22 to move and abut against the zeroing correcting surface 31, i.e. the second abutting surface A2, the displacement D which is the width of the welding seam W is then measured.

Figure 7:
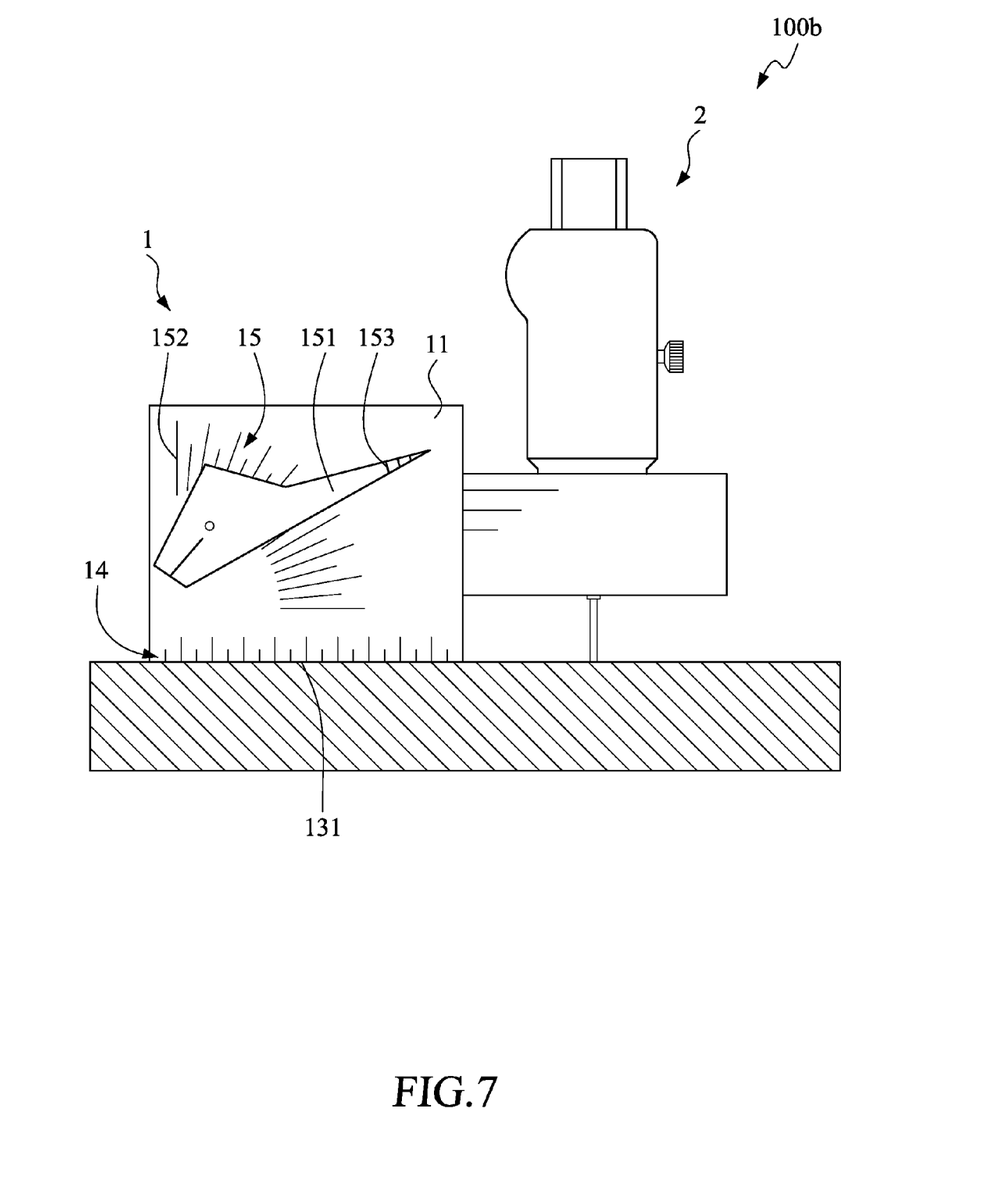
FIG. 7 is the first schematic drawing illustrates the electronic welding seam gauge according to the third embodiment of the present invention.
Figure 8:
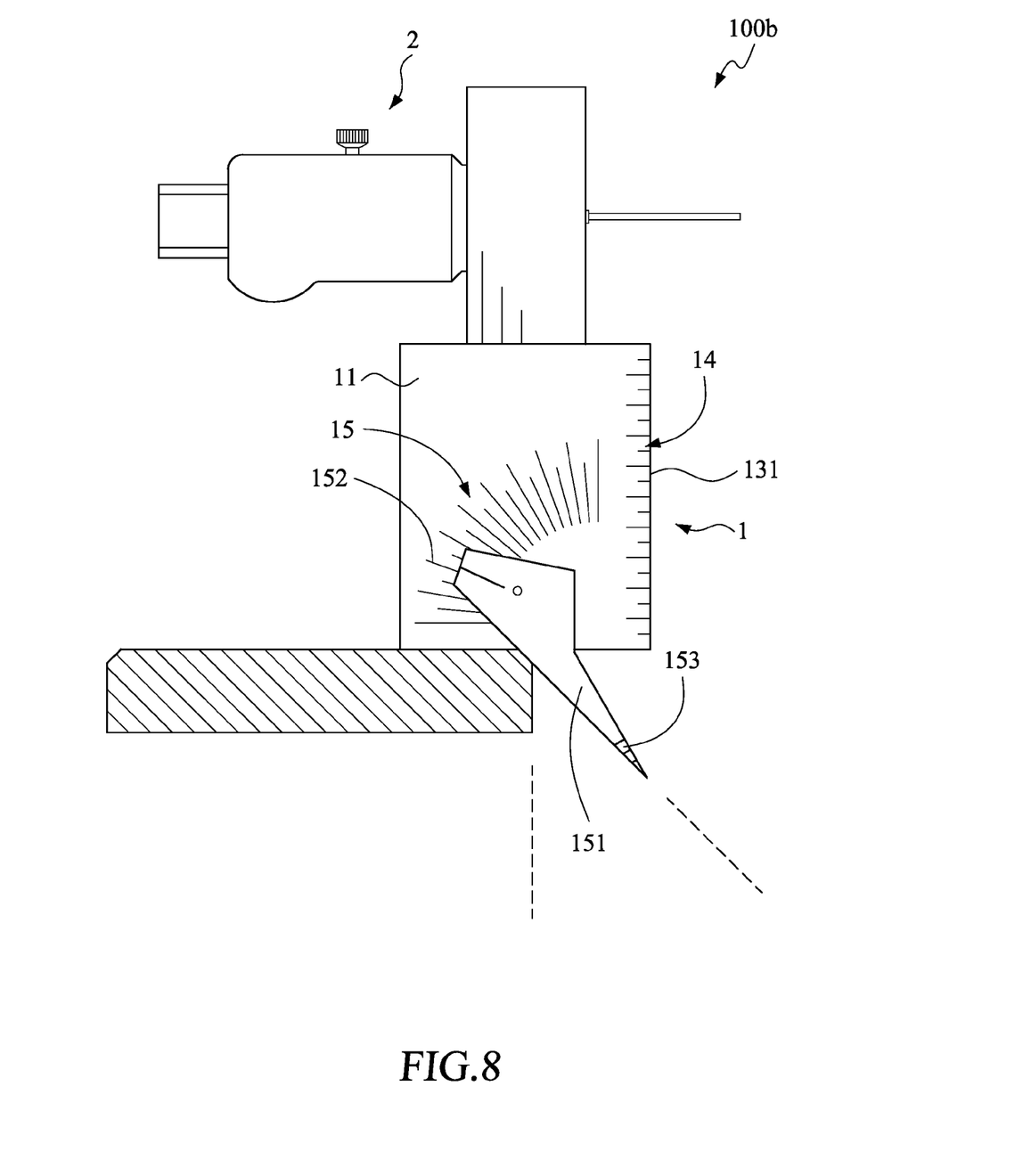
FIG. 8 is the second schematic drawing illustrates the electronic welding seam gauge according to the third embodiment of the present invention.

As referring to FIG. 7 and FIG. 8, an electronic welding seam gauge 100b of the third embodiment of the present invention further comprises a length measuring portion 14 and an angle measuring portion 15. The length measuring portion 14 is a layer of length scale provided on a side of the body portion 11 corresponding to the first reference surface 131 for measuring a length or drawing a line having a specific length. The angle measuring portion 15 has an angle probe 151 and an angle scale layer 152. The angle probe 151 is rotary disposed at a side surface of the body portion 11 of the reference positioning block 1, and the angle scale layer 152 is disposed on a side surface of the body portion 11 corresponding to the angle probe 151. An inclined angle of an inclined surface is indicated by the rotation of the angle probe 151. Moreover, the tip of the angle probe 151 is in conic shape and is engraved with a width scale layer 153, by which the the angle probe 151 is able to measure a width of a fine hole when the angle probe 151 is stuck into the hole.

The above description should be considered as only the discussion of the preferred embodiments of the present invention. However, a person with an ordinary skilled in the art may make various modifications to the present invention. Those modifications still fall within the spirit and scope defined by the appended claims.

What is claimed is:

1. An electronic welding seam gauge, comprising:
a reference positioning block having a contacting edge for being abutting against a first abutting surface on the contacting edge as a first reference point;
an electronic displacement measuring member, disposed at a side of the reference positioning block, having a displacement probe and a displaying portion, wherein a displacement that the displacement probe moves to abut against a second reference point of a second abutting surface with respect to the first reference point is displayed by the displaying portion; and
an angle probe rotary, disposed at a side surface of the reference positioning block, wherein the reference positioning block is provided with an angle graduation mark corresponding to the angle probe.

2. The electronic welding seam gauge as claimed in claim 1, wherein the reference positioning block is formed with a cantilever portion extending from the side of the reference positioning block, and the electronic displacement measuring member is fixed on the cantilever portion.

3. The electronic welding seam gauge as claimed in claim 2, wherein the contacting edge of the reference positioning block includes a first reference edge perpendicular to a moving direction of the displacement probe.

4. The electronic welding seam gauge as claimed in claim 3, wherein the contacting edge of the reference positioning block includes a second reference edge perpendicular to the moving direction of the displacement probe, and the second reference edge is provided at the cantilever portion with a horizontal level different to the first reference edge.

5. The electronic welding seam gauge as claimed in claim 2, wherein the contacting edge of the reference positioning block includes a third reference edge parallel to the moving direction of the displacement probe, and the third reference edge is provided at the other side of the reference positioning block.

6. The electronic welding seam gauge as claimed in claim 2, wherein the contacting edge of the reference positioning block includes a fourth reference edge parallel to the moving direction of the displacement probe, and the fourth reference edge is provided at a side of the cantilever portion of the reference positioning block.

7. The electronic welding seam gauge as claimed in claim 1, further comprising a zeroing correcting block having a zeroing correcting surface for allowing the zeroing surface to be abutting against by the contacting edge and the displacement probe so as to zeroing correcting the electronic displacement measuring member.

8. The electronic welding seam gauge as claimed in claim 1, wherein the electronic displacement measuring member has a transmitting element for transmitting data of the displacement to a storage member.

9. The electronic welding seam gauge as claimed in claim 1, wherein the displacement is displayed by the displaying portion with a precision of 0.01 mm.

* * * * *